(12) United States Patent
Kim et al.

(10) Patent No.: US 8,146,019 B2
(45) Date of Patent: Mar. 27, 2012

(54) METHOD AND TERMINAL FOR PLAYING AND DISPLAYING MUSIC

(75) Inventors: Hyo Young Kim, Seongnam-si (KR); Min Suk Kim, Seoul (KR); Dok Shin Lim, Seoul (KR); Andrea Kim, Seoul (KR); Hee Kyung Jeon, Seoul (KR); Kyoung Ae Lim, Seoul (KR); Min Soo Kwon, Seoul (KR); Hye Won Lee, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1019 days.

(21) Appl. No.: 12/027,030

(22) Filed: Feb. 6, 2008

(65) Prior Publication Data

US 2008/0190266 A1    Aug. 14, 2008

(30) Foreign Application Priority Data

Feb. 8, 2007    (KR) ................ 10-2007-0013447

(51) Int. Cl.
*G06F 3/033*    (2006.01)
(52) U.S. Cl. ................ 715/863; 345/173
(58) Field of Classification Search ........... 84/602, 84/601; 715/764, 202, 203, 702, 716, 719, 715/746, 748, 765, 779, 809, 830, 835, 863; 345/156, 169, 173, 440, 530
See application file for complete search history.

(56) References Cited

U.S. PATENT DOCUMENTS

| | | | |
|---|---|---|---|
| 6,396,523 B1 | 5/2002 | Segal et al. | |
| 6,452,609 B1 * | 9/2002 | Katinsky et al. | 715/716 |
| 6,966,037 B2 * | 11/2005 | Fredriksson et al. | 715/830 |
| 7,480,868 B2 * | 1/2009 | Novak et al. | 715/746 |
| 7,509,588 B2 * | 3/2009 | Van Os et al. | 715/835 |
| 7,596,761 B2 * | 9/2009 | Lemay et al. | 715/779 |
| 7,730,401 B2 * | 6/2010 | Gillespie et al. | 715/702 |
| 2002/0045960 A1 * | 4/2002 | Phillips et al. | 700/94 |
| 2004/0210825 A1 * | 10/2004 | Novak et al. | 715/500.1 |
| 2005/0081155 A1 * | 4/2005 | Martin et al. | 715/719 |
| 2005/0134578 A1 * | 6/2005 | Chambers et al. | 345/184 |
| 2005/0166136 A1 * | 7/2005 | Capps et al. | 715/500.1 |

(Continued)

FOREIGN PATENT DOCUMENTS

EP    1 672 471 A1    6/2006

(Continued)

OTHER PUBLICATIONS

Microsoft Corp., Windows Media Player 9 Series, BNS Document Id.—XP002356255, Jun. 7, 2003.

(Continued)

*Primary Examiner* — Doon Chow
*Assistant Examiner* — David Choi
(74) *Attorney, Agent, or Firm* — Jefferson IP Law, LLP (57) ABSTRACT

A method and a terminal for playing and displaying music are provided. The method includes selecting a desired track in a playback mode, playing the selected track, displaying information about the selected track and a playing progress bar and displaying a current play time for the selected track and a position corresponding to the current play time on the playing progress bar in order to update playing progress information. The method and terminal enable a user to adjust the playback and selection of tracks through a novel interface, thereby providing increased convenience for a user of a terminal equipped with a music player.

21 Claims, 12 Drawing Sheets

U.S. PATENT DOCUMENTS

| | | | |
|---|---|---|---|
| 2005/0210393 A1* | 9/2005 | Maeng | 715/751 |
| 2005/0210398 A1* | 9/2005 | Novak et al. | 715/765 |
| 2005/0210446 A1* | 9/2005 | Novak et al. | 717/115 |
| 2006/0055662 A1 | 3/2006 | Rimas-Ribikauskas et al. | |
| 2006/0238517 A1* | 10/2006 | King et al. | 345/173 |
| 2006/0267995 A1* | 11/2006 | Radloff et al. | 345/530 |
| 2007/0038941 A1* | 2/2007 | Wysocki et al. | 715/748 |
| 2007/0257881 A1* | 11/2007 | Nurmela et al. | 345/156 |
| 2008/0055263 A1* | 3/2008 | Lemay et al. | 345/173 |
| 2008/0120501 A1* | 5/2008 | Jannink et al. | 713/163 |
| 2008/0141135 A1* | 6/2008 | Mason et al. | 715/719 |
| 2008/0165141 A1* | 7/2008 | Christie | 345/173 |
| 2008/0168349 A1* | 7/2008 | Lamiraux et al. | 715/702 |
| 2009/0007017 A1* | 1/2009 | Anzures et al. | 715/835 |
| 2009/0153289 A1* | 6/2009 | Hope et al. | 340/5.1 |
| 2009/0313544 A1* | 12/2009 | Wood et al. | 715/716 |
| 2009/0313564 A1* | 12/2009 | Rottler et al. | 715/764 |
| 2010/0058253 A1* | 3/2010 | Son | 715/863 |
| 2010/0060586 A1* | 3/2010 | Pisula et al. | 345/169 |
| 2010/0245267 A1* | 9/2010 | Min et al. | 345/173 |

FOREIGN PATENT DOCUMENTS

| | | |
|---|---|---|
| EP | 1 775 925 A2 | 4/2007 |
| EP | 1 860 539 A1 | 11/2007 |
| KR | 10-2006-131152 A | 12/2006 |
| WO | 01/02949 A1 | 1/2001 |

OTHER PUBLICATIONS

Anonymous, Microsoft Released Windows Media Player 9 [Online], BNS Document Id.—XP002318894, Sep. 9, 2002, Retrieved from Internet: www.tcf.net/media9.html.

* cited by examiner

METHOD AND TERMINAL FOR PLAYING AND DISPLAYING MUSIC

PRIORITY

This application claims the benefit under 35 U.S.C. §119(a) of a Korean patent application filed in the Korean Intellectual Property Office on Feb. 8, 2007 and assigned Ser. No. 2007-0013447, the entire disclosure of which is hereby incorporated by reference.

BACKGROUND OF THE INVENTION

1. Field of the Invention

The present invention relates to an apparatus and method for playing a music file. More specifically, the present invention relates to a method and a terminal for playing and displaying a music file that enable a user to easily change the progress and volume of a music file being played in the terminal or select another music file.

2. Description of the Related Art

With advances in technology, terminals have developed from simple tools used simply to make and receive phone calls into multimedia devices that offer a wide variety of supplementary services. Such supplementary services include electronic note functions, gaming, and schedule management functions. Terminals have also been developed to use wireless Internet services which allow a user to find information on the Internet, to send and receive e-mails, and the like which significantly increases the convenience of use.

Further, a terminal with a music player for playing back music files has been developed to meet increasing demands for multimedia services. A terminal that is capable of playing back music files enables a user to listen to music in a manner similar to that of a conventional dedicated music file player such as a portable cassette player. The terminal can play back a desired music file and output the music file through a built-in speaker or earphone.

In general, after a playback mode is selected, a desired music file is selected for playback. During playback, a user may select a specific button or function in order to change the progress and volume of a music file being played. In order to select another music file, the user must return to an upper level menu within the playback mode.

When a music file is being played using a terminal with a music player in this manner, executing associated supplementary functions causes considerable inconvenience to the user. Thus, there is a need to develop a method for operating a music player in an easy and convenient manner. There is also an increasing need to provide a novel user interface for a user of a terminal equipped with a music player.

SUMMARY OF THE INVENTION

An aspect of the present invention is to address at least the above-mentioned problems and/or disadvantages and to provide at least the advantages described below. Accordingly, an aspect of the present invention is to provide a method and a terminal for playing and displaying music that provide increased user convenience.

Another aspect of the present invention is to provide a method and a terminal for playing and displaying music that enable a user to easily change the progress and volume of a music file being played, select another music file and pause the playback of the music file by contacting a touch screen.

Yet another aspect of the present invention is to provide a method and a terminal for playing and displaying music that provide a novel user interface for a user.

In accordance with an aspect of the present invention, a method for playing and displaying music in a terminal is provided. The method includes selecting a desired track in a playback mode, playing the selected track and displaying information about the selected track, a playing progress bar, a current play time for the selected track and a position corresponding to the current play time on the playing progress bar in order to update playing progress information.

In accordance with yet another aspect of the present invention, a terminal having a music player is provided. The terminal includes a memory unit for storing music tracks, a music player for playing the music tracks, a display unit having a touch screen for displaying a playing progress bar indicating current play time for a track being played and a volume control bar and a controller for controlling the display unit to display the playing progress bar in a first direction and the volume control bar in a second direction that intersects with the playing progress bar.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, detailed descriptions of well-known functions and constructions are omitted for clarity and conciseness.

In exemplary embodiments as described below, the term "playing progress bar" means a bar displayed on a display unit to indicate the progress of a track being played. As an example, the playing progress bar may be displayed on the display unit in a horizontal direction. The playing progress bar also enables a user to change the progress status of a track during playback by contacting the playing progress bar. A "volume control bar" is displayed on the display unit to control the volume of a track being played. As an example, the volume control bar may be displayed on the display unit in a vertical direction in such a manner as to intersect with the playing progress bar. The volume control bar is contacted by the user to increase or decrease the volume of a track being played. The term "playing point" refers to a point on the display unit representing a time duration corresponding to the track currently being played. The playing point is indicated at a location where the playing progress bar intersects with the volume control bar. Also, the term "track" means a file that is stored or downloaded onto the terminal. The file may include a music file, a video file or other type of multimedia file.

The term "contact" refers to a state in which a user's finger comes into contact with the surface of a display unit, including, but not limited to, a touch, a flick, and a flick and hold. "Touch" means an action of a user of lightly putting a finger on the display unit so as to make contact therewith and then detaching the finger from the display unit. "Flick" refers to an action of moving a finger quickly by drawing a line across the display unit. "Flick and hold" means an action of moving a finger quickly to draw a line across a display unit and then resting the finger on the display unit.

For convenience of explanation, a mobile communication terminal is described herein as the terminal. However, it will be obvious to those skilled in the art that the terminal may be any type of information and communication device that is equipped with a music player, including a mobile terminal, mobile phone, wired/wireless phone, Personal Digital Assistant (PDA), Smart Phone, audio device, MP3 player, notebook, personal computer, and applications thereof.

Figure 1:
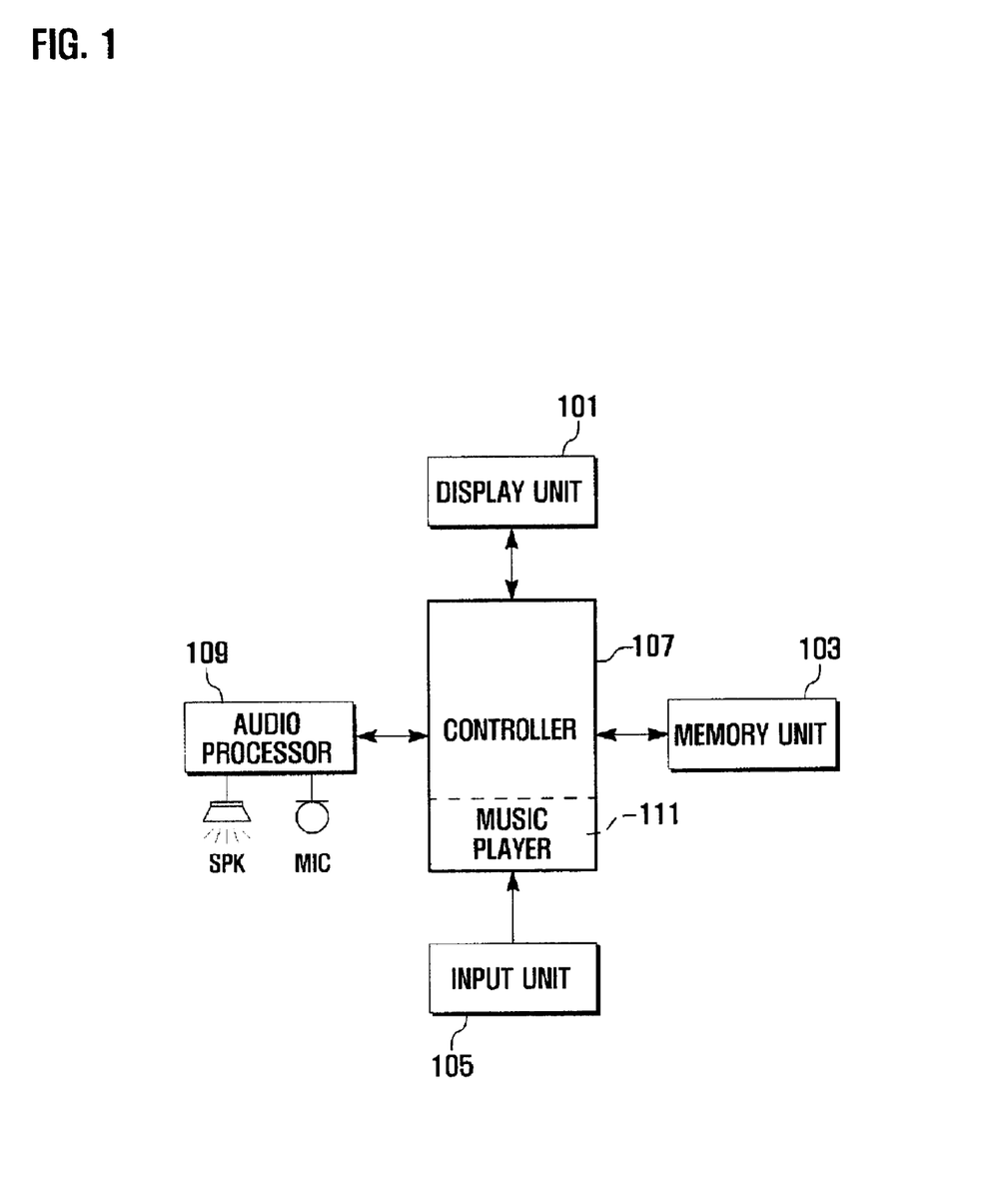
FIG. 1 is a schematic block diagram illustrating a configuration of a terminal equipped with a music player for playing and displaying music according to an exemplary embodiment of the present invention.

FIG. 1 is a schematic block diagram illustrating a configuration of a terminal equipped with a music player for playing and displaying music according to an exemplary embodiment of the present invention Referring to FIG. 1, a terminal according to an exemplary embodiment of the present invention includes a display unit 101, a memory unit 103, an input unit 105, a controller 107 having a music player 111, and an audio processor 109.

The display unit 101 displays data controlled and output by the controller 107. In an exemplary implementation, the display unit 101 may include a liquid crystal display (LCD). In this case, the display unit 101 also includes an LCD controller and an LCD display element. When the LCD is implemented to include a touch screen, the display unit 101 may function as an input portion. In an exemplary embodiment as illustrated and explained further below, the display unit 101 includes a touch screen.

When the terminal is in a playback mode, the display unit 101 displays a standby screen including a volume up/down cue, a managing area open cue, a toolbox area open cue and a previous/next cue. The previous/next cue may be used to display previous and next tracks or to play a track in reverse and forward directions.

During playback, the display unit 101 displays a playing progress bar, a volume control bar, the current time played (hereinafter referred to as "current play time"), the total track play time, the playing point, the managing area open cue and the toolbox area open cue.

In an exemplary implementation, the display unit 101 displays the playing progress bar and the volume control bar in the horizontal and vertical directions, respectively. Furthermore, the playing progress bar and the volume control bar may be arranged to intersect crosswise with each other.

When a flick and hold is performed on the playing progress bar during playback of a track, the display unit 101 displays a playing point at a point where the hold occurs. The display unit 101 also displays the current play time and total track play time to the left and right of the playing point, respectively. When a flick and hold is performed on the volume control bar during playback, the display unit 101 displays, above the playing point, a volume level at the point where the hold occurs.

If a flick is performed at an end of the playing progress bar during playback of a track, the display unit 101 displays the title of the previous or next track. If a contact such as a flick and hold or flick occurs on the playing progress bar or volume control bar, the display unit 101 also displays an arrow on the playing point so as to point in the direction of the flick and hold or flick. Details of the flick and hold operation as well as the flick operation are provided below.

The memory unit 103 includes a program memory and a data memory required for performing functions of the terminal. The program memory stores programs for controlling the general operations of the terminal, a program for controlling the playing of a track, and the like. The data memory temporarily stores data generated while executing the programs. The memory unit 103 stores music files and related data, for example an image of a performer's album jacket, a playlist of an album and the like. The music files may be stored in a music list.

The input unit 105 receives a user's manipulation signal for controlling operations of the terminal. The input unit 105 receives user input signals to select a playback mode and a desired track, to play a track and pause the playback of the track, to control the volume of a track being played, and to select a previous or next track. When the display unit 101 is a touch screen, the display unit 101 may also serve as the input unit 105.

The input unit 105 may include at least one of a key pad containing a plurality of key buttons, a touch panel for converting a user's contact into an input signal, a pointing device such as an optical mouse, a rotary jog dial, a touch wheel for converting a user's contact and contact rotation into an input signal, a scroll wheel for converting a wheel rotation into an input signal and other similar or equivalent units.

The controller 107 performs the overall control operation of the terminal. The controller 107 may include an internal or external music player 111. In an exemplary embodiment, the music player 111 is an internal music player. If a specific track is selected from a music list, the music player 111 plays the selected track. The music player 111 may be, for example, an MP3 player.

If a user performs a flick and hold on the playing progress bar during playback in the direction in which a track is playing, i.e. in the rightward direction from a playing point, the controller 107 performs a fast forward (FF) operation on the track being played. If a flick is performed in the rightward direction from a playing point towards the end of the playing progress bar, the controller 107 selects a next track for playback. If the user performs a flick and hold on the playing progress bar during playback in the direction opposite to the direction in which a track is playing, i.e. in the leftward direction from a playing point, the controller 107 performs a rewind (REW) operation on the track being played. If a flick is performed in the leftward direction from a playing point towards the end of the playing progress bar, the controller 107 selects a previous track for playback. Further, if the user contacts the playing progress bar to move a playing point, the controller 107 also moves the volume control bar correspondingly.

If the user performs a flick and hold on the volume control bar during playback upwards from a playing point, the controller 107 increases the volume of a track being played. If the user performs a flick and hold on the volume control bar downwards from the playing point, the controller 107 decreases the volume of the current track. Further, if the user contacts the volume control bar to move a playing point, the controller 107 also moves the playing progress bar correspondingly.

If the user touches any region of the display unit 101 during playback, the controller 107 pauses the playback of a track being played. If the user touches the region in a paused state, the controller 107 resumes the playback of the track.

The audio processor 109 reproduces a music track output from the controller 107 through a speaker SPK and outputs an audio signal generated through a microphone MIC to an audio codec of the controller 107.

The terminal may further include a radio frequency (RF) unit for performing wireless communications. The RF unit includes an RF transmitter that up-converts the frequency of a signal to be transmitted and amplifies the signal, and an RF receiver that low-noise amplifies a received signal and down-converts its frequency.

Figure 2:
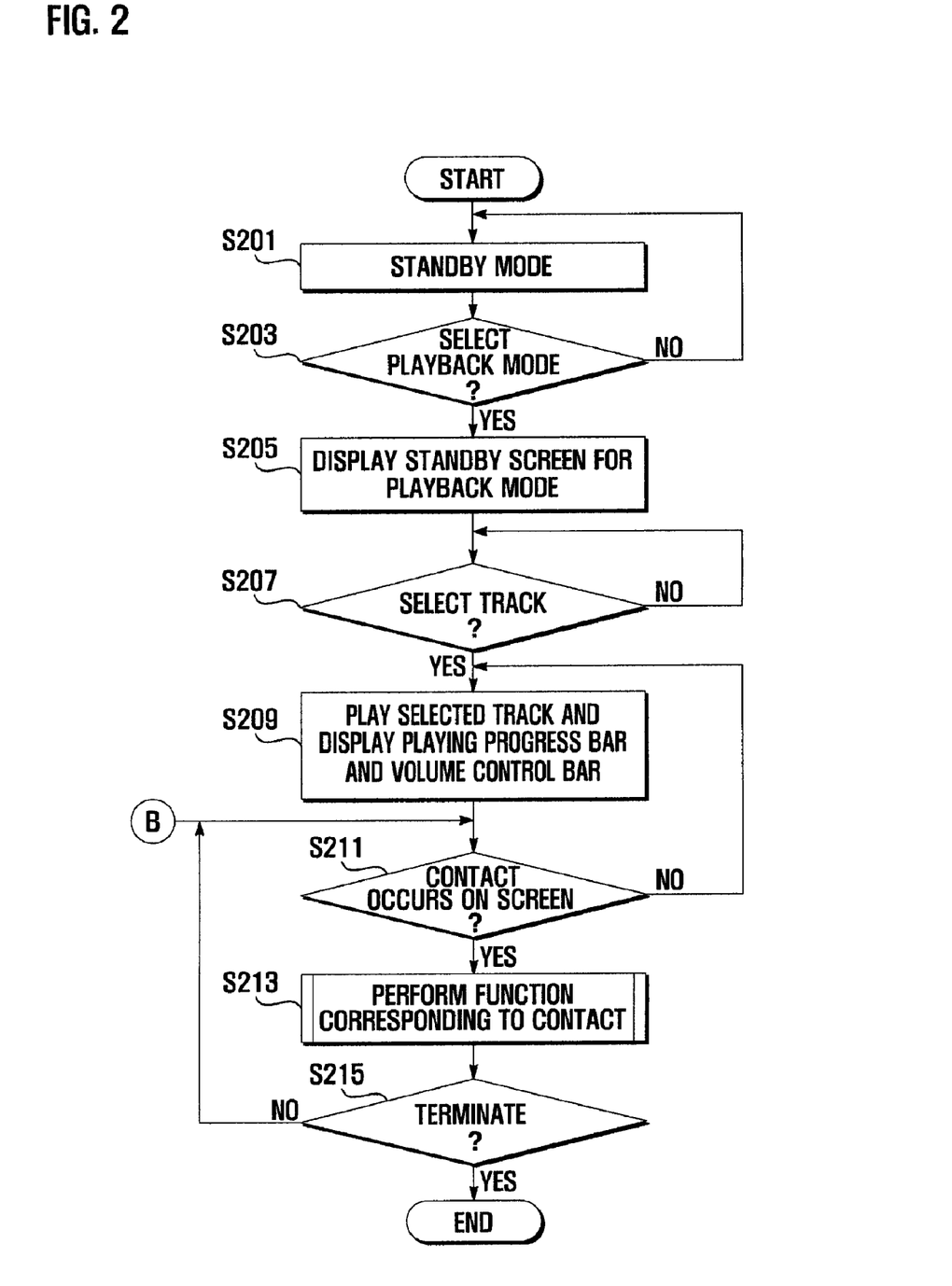
FIG. 2 is a flowchart illustrating a method for playing and displaying music according to another exemplary embodiment of the present invention.
Figure 3A:
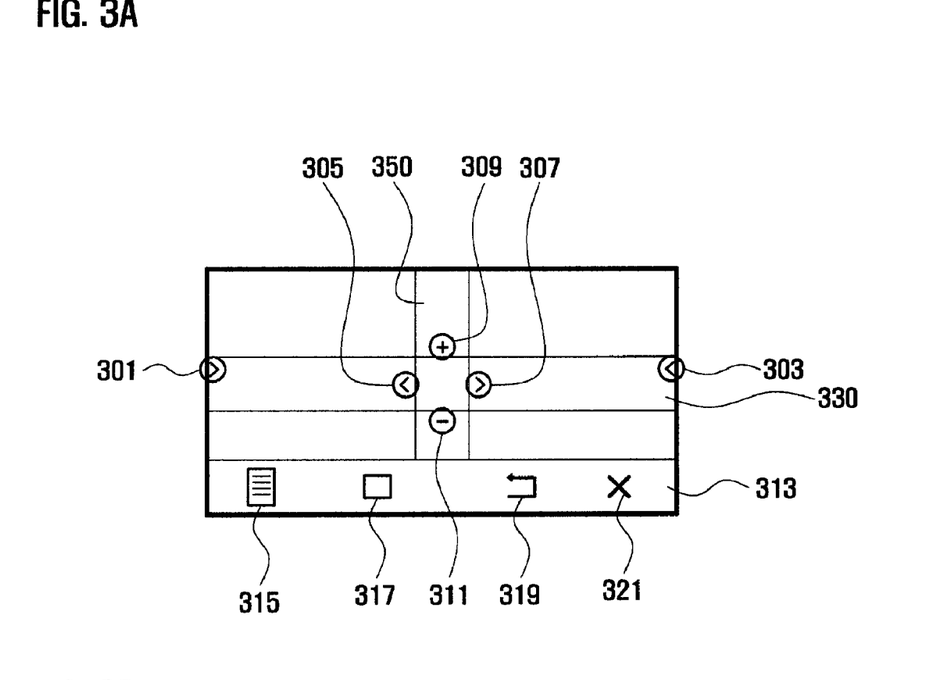
FIG. 3A illustrates an exemplary screen of a terminal on which a playback mode has been selected.
Figure 3B:
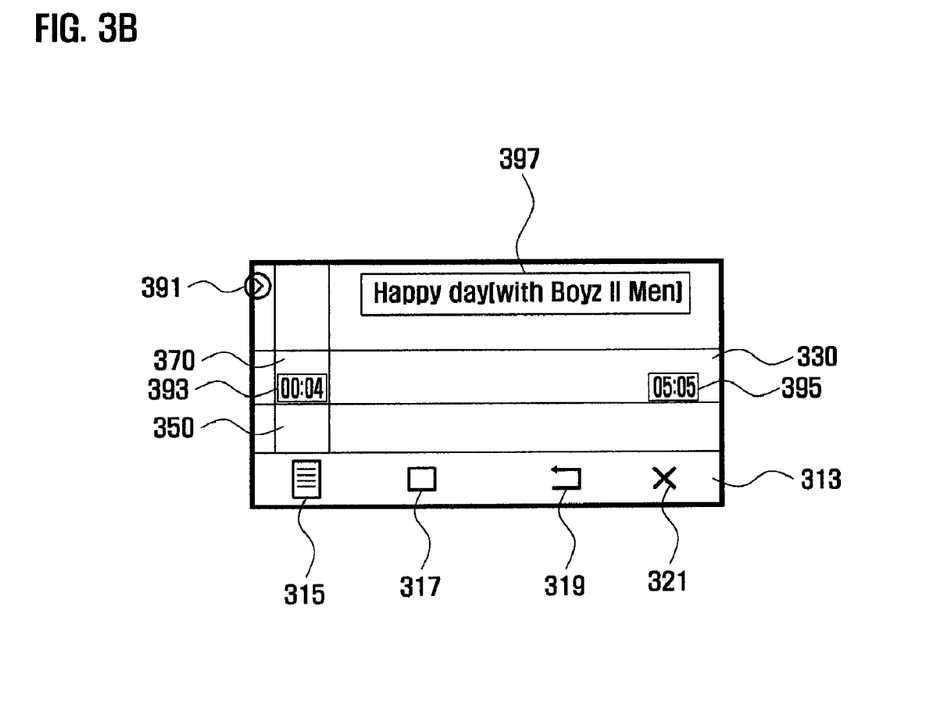
FIG. 3B illustrates an exemplary screen of a terminal on which a music track is playing.

A method for playing and displaying music in a terminal according to an exemplary embodiment of the present invention is described in detail with reference to FIGS. 2 through 3B. FIG. 2 is a flowchart illustrating a method for playing and displaying music according to an exemplary embodiment of the present invention. FIG. 3A illustrates an exemplary screen of the terminal on which a playback mode has been selected, and FIG. 3B illustrates an exemplary screen of the terminal on which a music track is playing.

Referring to FIGS. 1 through 3B, when the terminal is in a standby mode in step S201, the controller 107 determines whether a playback mode is selected in step S203. For example, when the user touches a point on the display unit 101 implemented as a touch screen, the controller 107 may control the display unit 101 to display a main menu containing a playback mode option. If the user selects the playback mode option in the main menu, the controller 107 selects the playback mode.

If the playback mode is selected, the controller 107 controls the display unit 101 to display a standby screen for the playback mode in step S205. An example of a standby screen is shown in FIG. 3A.

Referring to FIG. 3A, the display unit 101 displays a managing area open cue 301, a toolbox area open cue 303, a previous cue 305, a next cue 307, a volume up cue 309, a volume down cue 311 and a soft key area 313. The soft key area 313 includes an option key 315, a main menu key 317, an upper level menu key 319, and a standby screen key 321. The previous cue 305 and the next cue 307 are located at separate points along the horizontal playing progress bar 330 as illustrated by the two horizontal parallel lines on the touch screen.

Similarly, the volume up cue 309 and the volume down cue 311 are located at separate points along the vertical playing progress bar 350 as illustrated by the two vertical parallel lines on the touch screen.

The controller 107 then determines whether a music track is selected in step S207. That is, when the standby screen is displayed at step S205, if the controller 107 detects a user's touch on the upper level menu key 319 in the soft key area 313, an upper level menu is displayed. The upper level menu contains submenus including a playback mode submenu, a music list submenu and the like. The user touches to select a specific track from tracks stored within a music list in the memory unit 103 that are displayed upon selection of the music list submenu.

When the playback mode is selected at step S203, instead of the user selecting a desired track from a music list displayed upon a touch of the upper level menu key 319, the controller 107 may initially control the display unit 101 to display the music list submenu for the user to select a desired track for playback. Alternatively, if the desired track has previously been played, the user may touch a point on the standby screen at which the horizontal playing progress bar and vertical volume control bar intersect with each other, as shown in FIG. 3A, so as to select the previously played track for playback.

If a music track is selected in step S207, the controller 107 plays back the selected track and controls the display unit 101 to display the playing progress bar and the volume control bar showing playback of the track in step S209. The horizontal playing progress bar and vertical volume control bar are initially displayed in step S205 after selection of the playback mode, as shown in FIG. 3A, prior to selection of a music track in step S207. At that time, the playback functions of the playing progress bar and the volume control bar on the standby screen were not yet assigned.

Referring to FIG. 3B, on playing the selected track in step S209, a playing progress bar 330 is displayed on the display unit 101 in the horizontal direction while the desired track is being played. The playing progress bar 330 indicates the playing progress of the current track. A volume control bar 350 is also displayed on the display unit 101 in a vertical direction so as to intersect with the playing progress bar 330. The volume control bar 350 indicates the volume level of the track being played. The playing progress bar 330 and the volume control bar 350 are arranged to intersect crosswise with each other. Further, a playing point 370 appears at a location where the playing progress bar 330 and the volume control bar 350 intersect.

The controller 107 also controls the display unit 101 to display a list display cue 391, the current play time 393, the total track play time 395, and current track information 397. While FIG. 3B illustrates an example in which the current track information 397 contains the title and artist name of the current track, it may contain other details, either additionally or alternatively.

Thereafter, the controller 107 determines whether a contact occurs on the screen in step S211. If a contact occurs on the screen, the controller 107 performs a function corresponding to the contact in step S213. The controller 107 then determines whether the process has terminated in step S215. The steps S211 through S215 are described in greater detail hereinafter.

Figure 4:
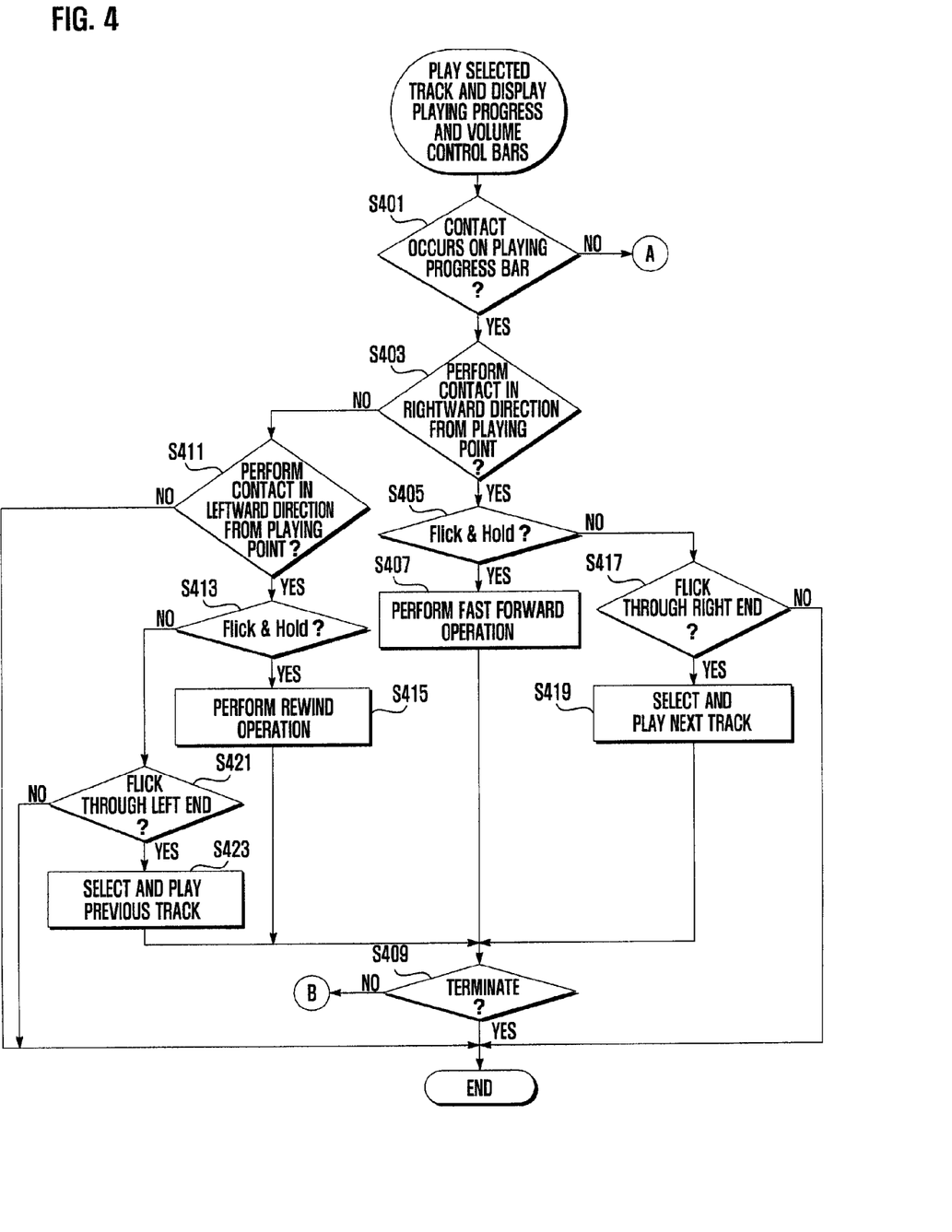
FIG. 4 is a flowchart illustrating an exemplary operation of a terminal that is performed upon contacting a playing progress bar according to an exemplary method of FIG.2.

The operation of the terminal when a contact occurs on the playing progress bar according to an exemplary method of FIG. 2 is described in detail with reference to FIGS. 4 through 6D. FIG. 4 is a flowchart illustrating an exemplary operation of a terminal performed upon contacting a playing progress bar according to the method of FIG. 2. FIGS. 5A through 5D illustrate exemplary screens of the terminal on which fast forward and rewind operations have been performed on a music track being played. FIGS. 6A through 6D illustrate exemplary screens of the terminal on which previous and next music tracks have been selected.

Referring to FIGS. 1, 4, 5A through 5D, and 6A through 6D, in a state in which the selected music track is playing and the playing progress bar and the volume control bar are displayed at step S209, the controller 107 first determines whether a contact occurs on the playing progress bar in step S401.

Figure 7:
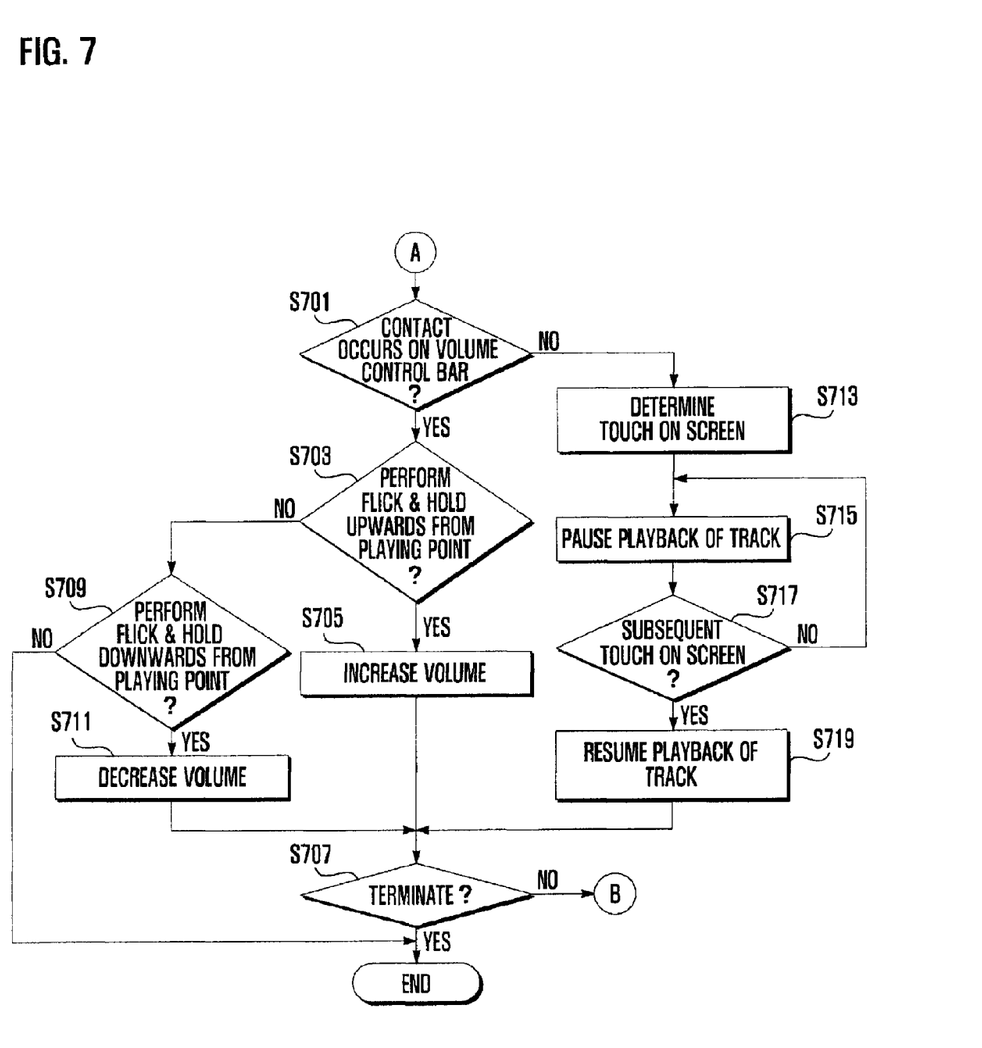
FIG. 7 is a flowchart illustrating an exemplary operation of a terminal that is performed upon contacting a volume control bar or screen according to an exemplary method of FIG. 2.

If a contact does not occur on the playing progress bar, the process continues as described later in relation to FIG. 7.

If a contact occurs on the playing progress bar at step S401, the controller 107 determines whether the contact on the playing progress bar occurs in the rightward direction from a playing point in step S403. Referring to FIG. 3B, for example, the controller 107 may determine whether the playing progress bar is contacted during playback in the rightward direction from the playing point 370, i.e. in the direction of progress of the playing point 370 while the track is playing.

Figure 5A:
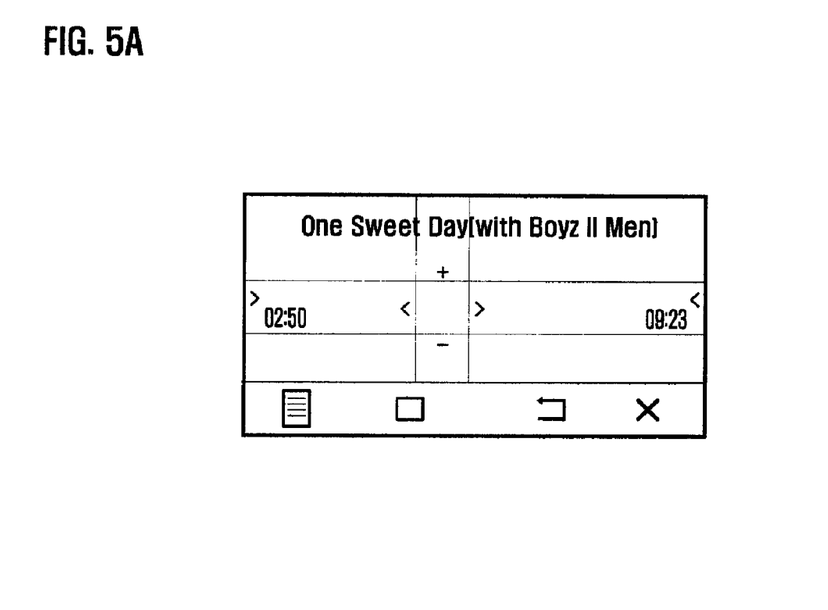
FIGS. 5A through 5D illustrate exemplary screens of a terminal on which fast forward and rewind operations have been performed on a track being played.

If the contact occurs in the rightward direction from a playing point, the controller 107 determines whether the contact is a flick and hold in step S405. More specifically, the controller 107 determines whether a flick and hold action occurs on the playing progress bar displayed on the display unit 101 in the rightward direction from the playing point. While a track is being played as shown in FIG. 5A, the user can flick and hold over the playing progress bar in the rightward direction from the playing point, as shown in FIG. 5B.

If the contact is a flick and hold as determined at step S405, the controller 107 performs a fast forward (FF) operation on the track being played in step S407.

Figure 5B:
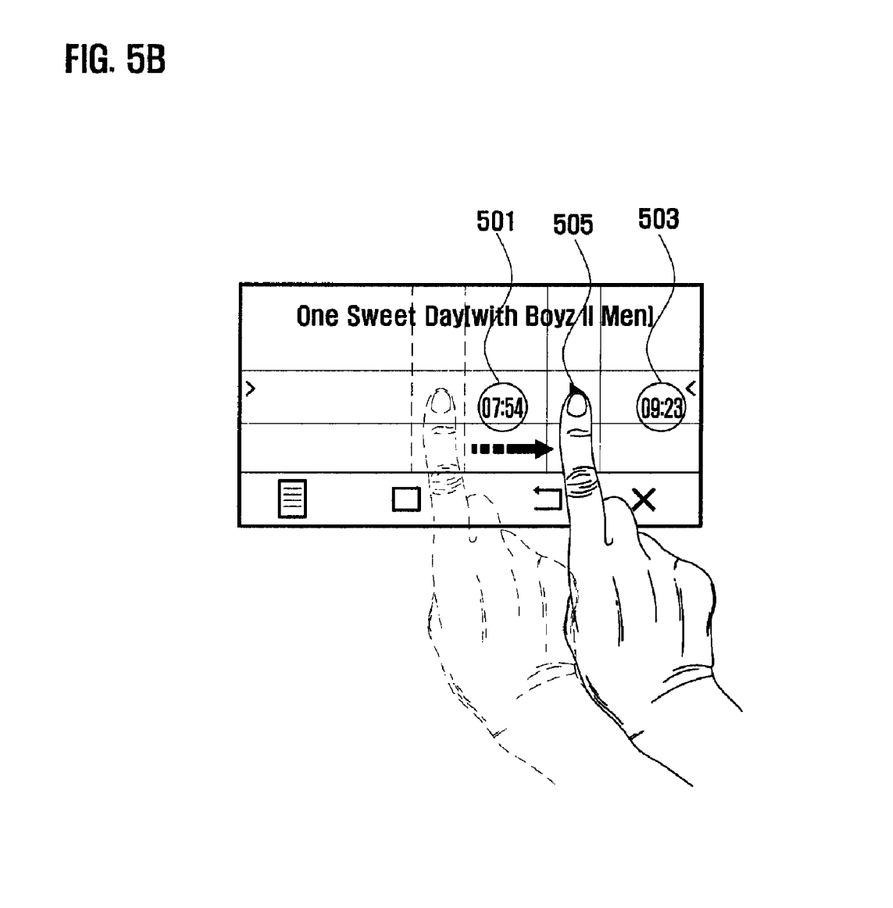

Referring to FIG. 5B, upon recognizing the user's flick and hold action, the controller 107 moves the volume control bar together with the flick action to a point where the hold occurs. The controller 107 also controls the display unit 101 to display a current play time 501 corresponding to the point where the hold occurs and a total track play time 503 on the left and right side, respectively, of the point where the hold occurs. The size of digits in the current play time 501 and the total track play time 503 are larger than that of digits in the current play time 393 and the total track play time 395 shown in FIG. 3B that were displayed prior to the flick and hold. When the flick and hold occurs, the display unit 101 also displays an arrow 505 on the playing point so as to point in the direction of the flick and hold, i.e. in the rightward direction in this example.

Subsequently, the controller 107 determines whether the operation has terminated in step S409.

If the contact on the playing progress bar does not occur in the rightward direction from a playing point at step S403, the controller 107 determines whether the contact on the playing progress bar occurs in the leftward direction from a playing point, i.e. in the direction opposite to the direction of progress of the playing point while the track is playing in step S411.

Figure 5C:
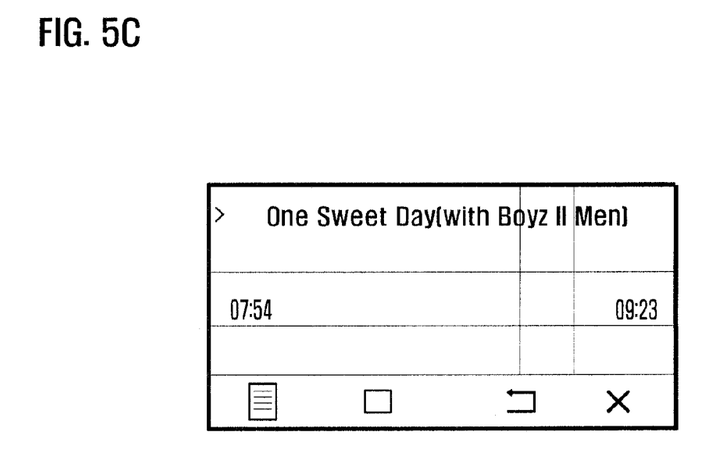

If the contact occurs in the leftward direction from a playing point, the controller 107 determines whether the contact is a flick and hold in step S413. More specifically, the controller 107 determines whether a flick and hold action occurs on the playing progress bar in the leftward direction from the playing point. For example, while a track is being played as shown in FIG. 5C, the user can flick and hold over the playing progress bar in the leftward direction from the playing point, as shown in FIG. 5D.

If the contact is a flick and hold at step S413, the controller 107 performs a rewind (REW) operation on the track being played in step S415.

Figure 5D:
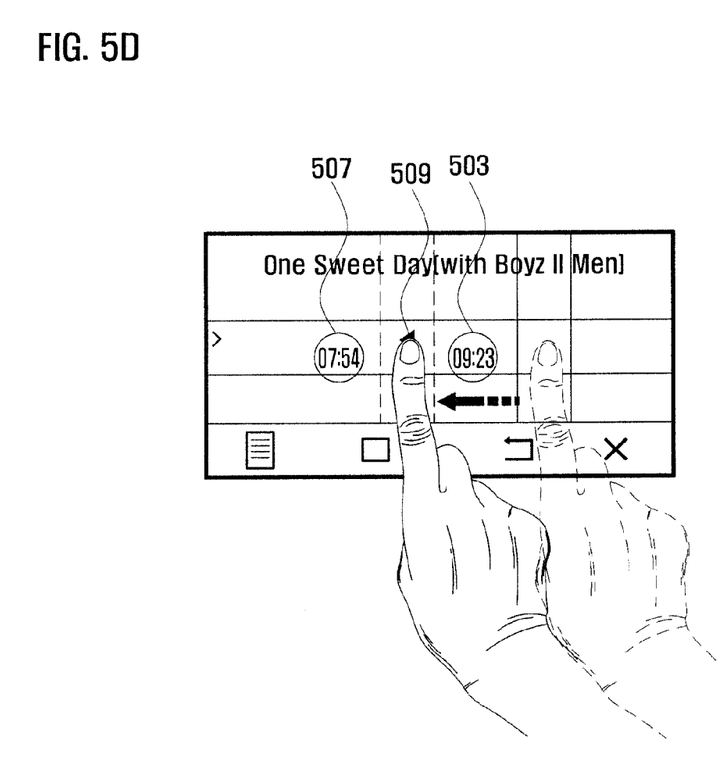

Referring to FIG. 5D, upon recognizing that the user's flick and hold action is performed on the playing progress bar in the leftward direction, the controller 107 moves the volume control bar in correspondence with the flick action to a point where the hold occurs. The controller 107 also controls the display unit 101 to display a current play time 507 corresponding to the point where the hold occurs and a total track play time 503 on the left and right side, respectively, of the point where the hold occurs. When the flick and hold occurs, the display unit 101 also displays an arrow 509 on the playing point so as to point in the direction of the flick and hold, i.e. in the leftward direction.

Subsequently, the controller 107 determines whether the operation has terminated at step S409.

Figure 6A:
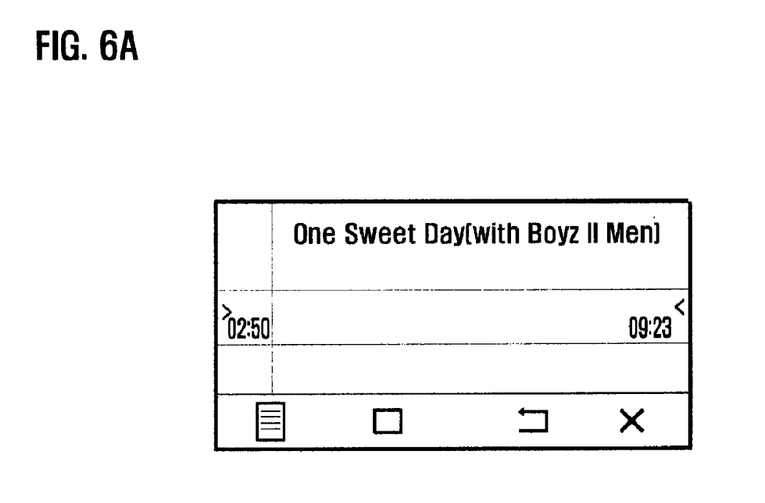
FIGS. 6A through 6D illustrate exemplary screens of a terminal on which previous and next tracks have been selected.
Figure 6B:
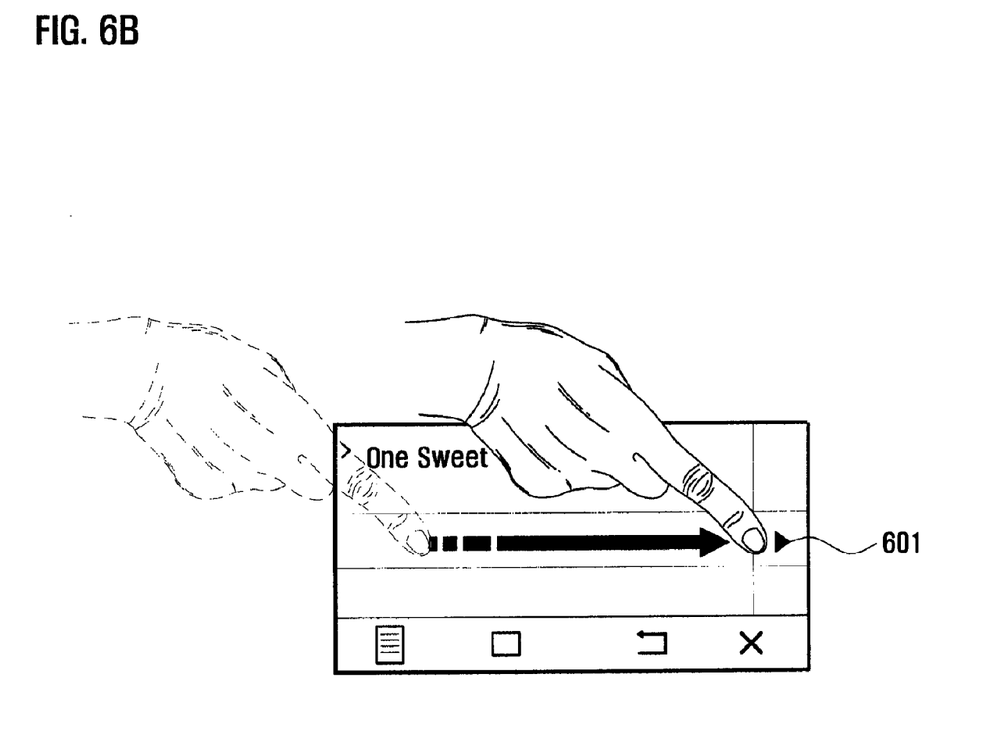

If the contact is not a flick and hold at step S405, the controller 107 determines whether a flick is performed through a right end of the playing progress bar in step S417. While a track is playing as shown in FIG. 6A, the user can flick through the right end of the playing progress bar, as shown in FIG. 6B.

If a flick occurs at step S417, the controller 107 selects a next track for playback in step S419. More specifically, upon recognizing the user's flick through the right end of the playing progress bar, the controller 107 selects the next track from tracks in a music list and plays the next track. In this case, the controller 107 controls the display unit 101 to display the title of the next track at the right end of the playing progress bar. Referring to FIG. 6B, when the flick occurs, the display unit 101 also displays an arrow 601 on the playing point so as to point in the direction of the flick, i.e. in the rightward direction.

Subsequently, the process continues at step S409.

Figure 6C:
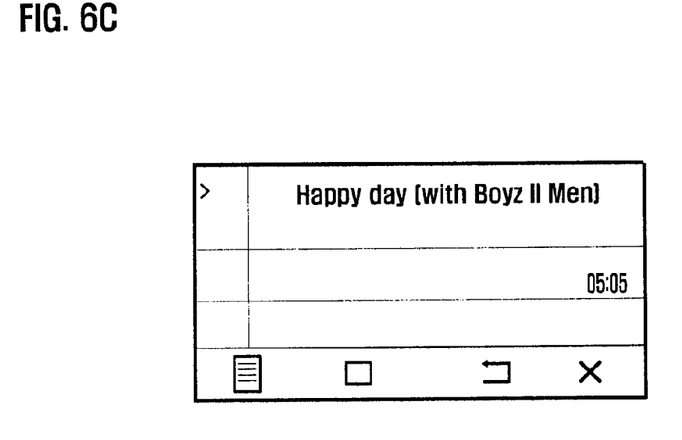
Figure 6D:
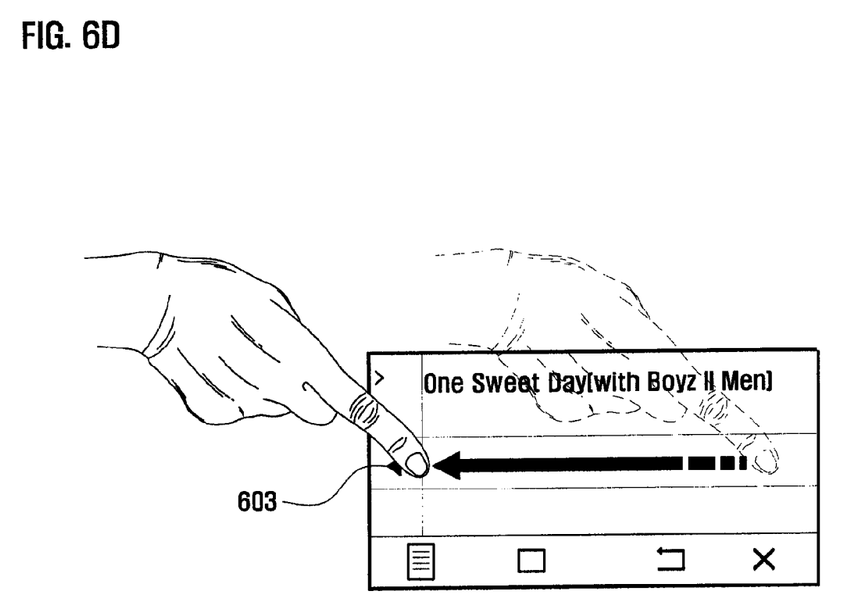

If the contact performed in the leftward direction from the playing point is not a flick and hold at step S413, the controller 107 determines whether a flick is performed to a left end of the playing progress bar in step S421. While a track is playing as shown in FIG. 6C, the user can flick through the left end of the playing progress bar, as shown in FIG. 6D.

If a flick occurs at step S421, the controller 107 selects a previous track for playback in step S423. More specifically, upon recognizing the user's flick through the left end of the playing progress bar, the controller 107 selects the previous track from tracks in a music list and plays back the previous track. In this case, the controller 107 controls the display unit 101 to display the title of the previous track at the left end of the playing progress bar. Referring to FIG. 6D, when the flick occurs, the display unit 101 also displays an arrow 603 on the playing point so as to point in the direction of the flick, i.e. in the leftward direction.

Subsequently, the process continues in step S409.

Figure 8A:
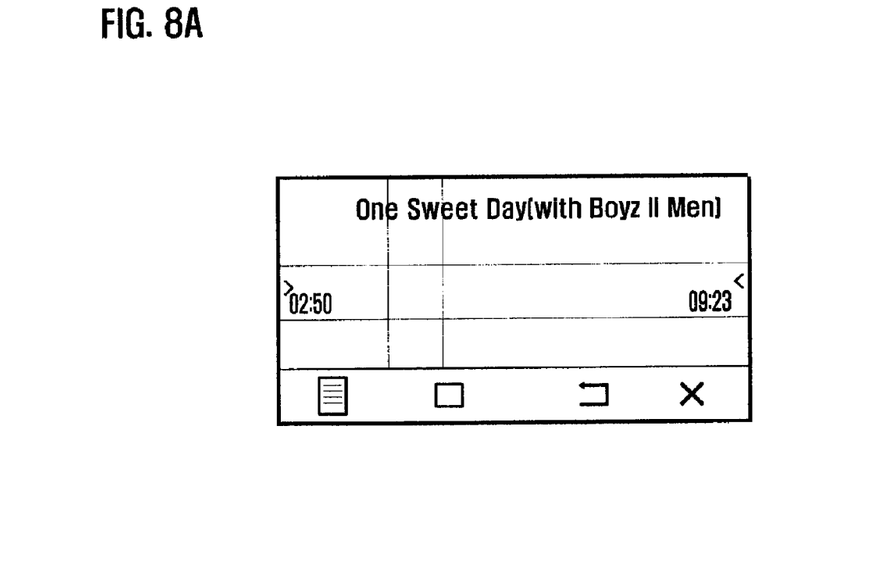
FIGS. 8A through 8D illustrate exemplary screens of a terminal on which a volume of a track being played has been increased and decreased.
Figure 8B:
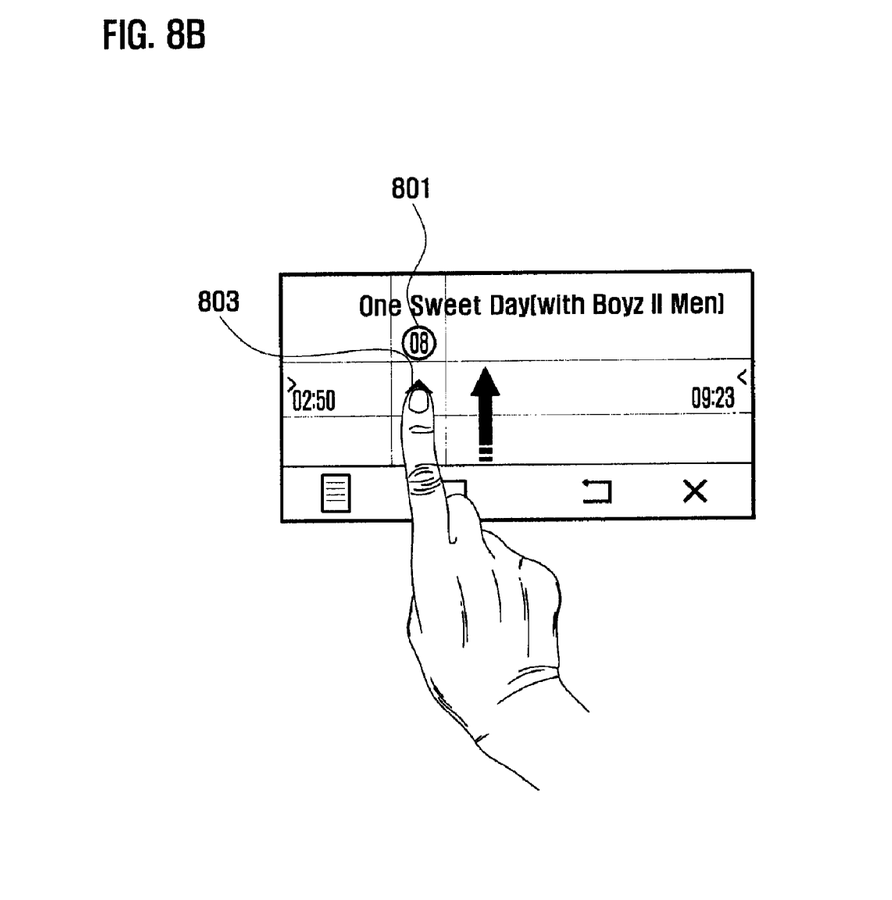
Figure 8C:
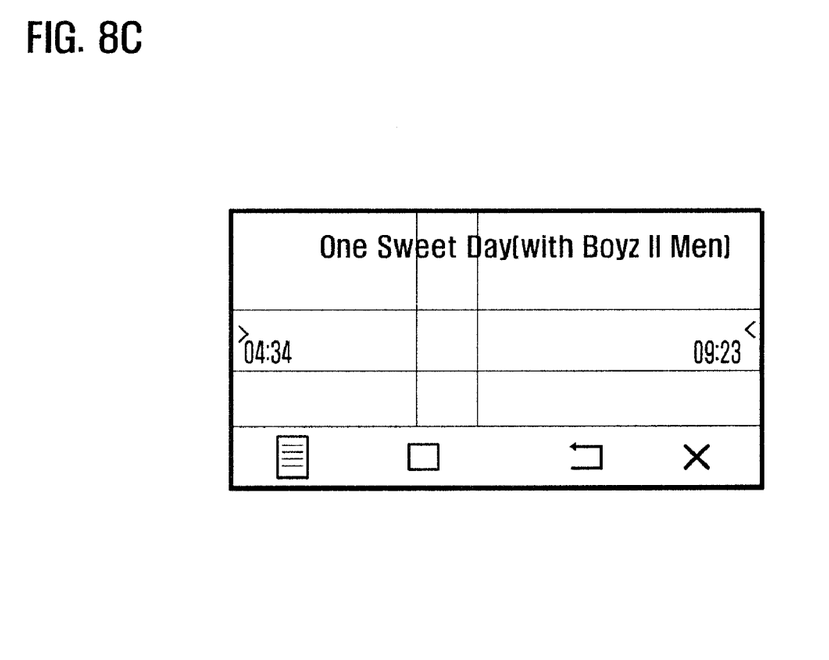
Figure 8D:
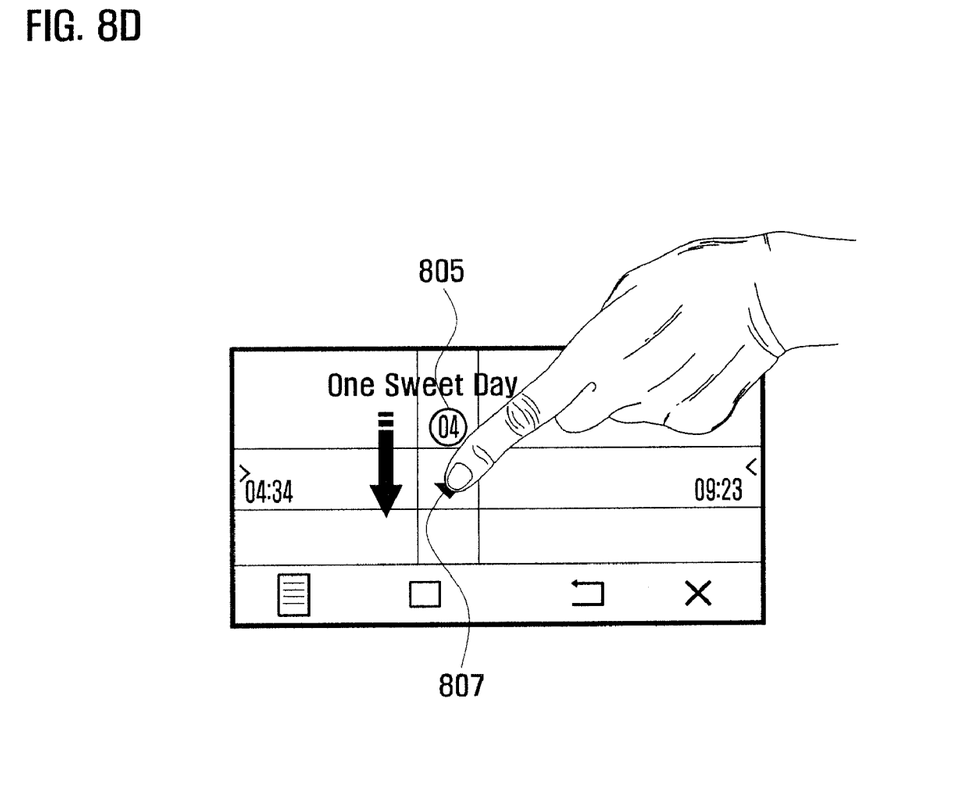
Figure 9:
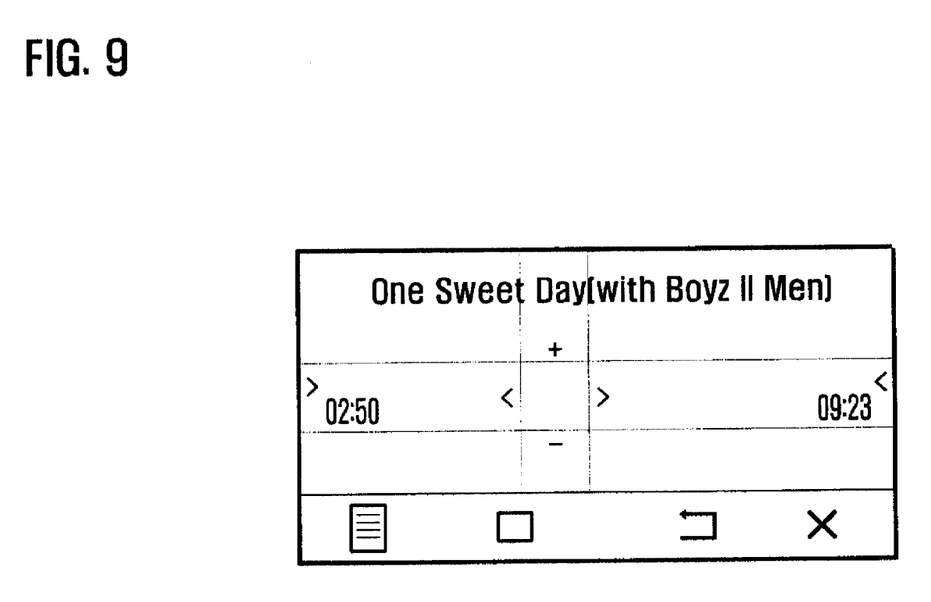
FIG. 9 illustrates an exemplary screen of a terminal on which the playback of a track has been paused.

An exemplary operation of the terminal when a contact occurs on the volume control bar and an exemplary screen according to the method of FIG. 2 is described in detail with reference to FIGS. 7 through 9. FIG. 7 is a flowchart illustrating an exemplary operation of the terminal performed upon contacting the volume control bar or screen according to the method of FIG. 2. FIGS. 8A through 8D illustrate exemplary screens of the terminal on which a volume of a track being played has been increased or decreased. FIG. 9 illustrates an exemplary screen of the terminal on which the playback of a track has been paused.

Referring to FIGS. 1, 4, 7, 8A through 8D and 9, if a contact does not occur on the playing progress bar at step S401, the controller 107 determines whether a contact occurs on the volume control bar in step S701.

If a contact occurs on the volume control bar, the controller 107 determines whether the contact is a flick and hold performed on the volume control bar upwards from a playing point in step S703. While a track is being played as shown in FIG. 8A, the user can flick and hold over the volume control bar upwards from the playing point, as shown in FIG. 8B.

If it is determined that the contact is a flick and hold performed upwards from a playing point at step S703, the controller 107 increases the volume of a track being played to a volume level (801 in FIG. 8B) corresponding to a point where the hold occurs in step S705. Referring to FIG. 8B, upon recognizing that the user performs a flick and hold on the volume control bar upwards from the playing point, the controller 107 moves the playing progress bar together with the flick action to a point where the hold occurs. The controller 107 also controls the display unit 101 to display the volume level 801 corresponding to the point where the hold occurs above the same point. When the flick and hold occurs, the display unit 101 also displays an arrow 803 on the playing point so as to point in the direction of the flick and hold, i.e. in the upward direction.

Subsequently, the controller 107 determines whether the operation has terminated in step S707.

If it is determined that the contact occurring on the volume control bar is not a flick and hold performed upwards from a playing point at step S703, the controller 107 determines whether the contact is a flick and hold performed downwards from a playing point in step S709. While a track is being played as shown in FIG. 8C, the user can flick and hold over the volume control bar downwards from the playing point, as shown in FIG. 8D.

If the contact is a flick and hold performed downwards from the playing point at step S709, the controller 107 decreases the volume of a track being played to a volume level (805 in FIG. 8D) corresponding to a point where the hold occurs in step S711. Referring to FIG. 8D, upon recognizing that the user performs a flick and hold on the volume control bar downwards from the playing point, the controller 107 moves the playing progress bar together with the flick action to a point where the hold occurs. The controller 107 also controls the display unit 101 to display the volume level 805 corresponding to the point where the hold occurs above the same point. When the flick and hold occurs, the display unit 101 also displays an arrow 807 on the playing point so as to point in the direction of the flick and hold, i.e. in the downward direction.

Thereafter, the controller 107 determines whether the operation has terminated at step S707.

If a contact does not occur on the volume control bar at step S701, the controller 107 determines that the contact is a touch on the screen in step S713. During playback, the controller 107 determines that a touch by the user occurs in any region of the display unit 101. For example, the controller 107 may determine that a user's touch occurs on the playing point. A touch means an action of a user of lightly putting a finger on the display unit 101 so as to make contact therewith and then lifting the finger from the display unit 101.

If a touch occurs during playback, the controller 107 pauses the playback of a track in step S715, as shown in FIG. 9. Upon pausing the playback of the track, the controller 107 controls the display unit 101 to display a volume up/down cue, a managing area open cue, a toolbox area open cue, and a previous/next cue that are not displayed during playback.

Next, the controller 107 determines whether a subsequent touch action occurs in step S717. If a subsequent touch action occurs, the controller 107 resumes the playback of the track in step S719.

For example, upon determining that a subsequent touch occurs on the playing point, the controller 107 may resume the playback of the track. That is, if a touch occurs during playback, the controller 107 pauses the playback of a track. If a touch occurs in a paused state, the controller 107 resumes the playback of the track.

Thereafter, the controller 107 determines whether the operation has terminated at step S707.

A method and a terminal for playing and displaying music according to an exemplary embodiment of the present invention enable a user to change the progress and volume of a track being played, pause the playback of the track, and select a next or previous track by contacting a playing progress bar, volume control bar, or screen during playback. The present invention also provides a novel user interface including a playing progress bar indicating the progress of a track being played and a volume control bar for adjusting the volume of the track that are arranged to intersect with each other in a crosswise manner. Thus, increased convenience can be provided for a user of a terminal equipped with a music player.

Certain aspects of the present invention can also be embodied as computer readable code on a computer readable recording medium. A computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

Although the present invention has been particularly shown and described with reference to exemplary embodiments thereof, it will be understood by those of ordinary skill in the art that various changes and modifications in form and details may be made without departing from the spirit and scope of the present invention as defined by the following claims and their equivalents.

What is claimed is:

1. A method for playing and displaying music in a terminal comprising:
    selecting a desired track in a playback mode;
    playing the selected track;
    displaying a playing progress bar and information about the selected track;
    displaying a current play time for the selected track and a position corresponding to the current play time on the playing progress bar; and
    wherein the displaying of the playing progress bar and the information about the selected track comprises:
        displaying a volume control bar intersecting with the playing progress bar such that the volume control bar moves as the current play time changes; and
        displaying a point where the playing progress bar and the volume control bar intersect as a playing point.

2. The method of claim 1, wherein the displaying of the playing progress bar comprises displaying the playing progress bar on a display unit in a horizontal direction and further wherein the displaying of the volume control bar comprises displaying the volume control bar in a direction perpendicular to the playing progress bar such that the playing progress bar and the volume control bar intersect with each other in a crosswise manner.

3. The method of claim 2, further comprising playing, if a flick and hold action is performed on the playing progress bar, a portion of a track corresponding to a position where the hold occurs.

4. The method of claim 3, further comprising moving the volume control bar to the position where the hold occurs and displaying a current play time corresponding to the position where the hold occurs.

5. The method of claim 4, wherein the playing of the portion of the track further comprises performing, if the flick and hold is performed in a direction of progress of the playing point while the track is playing, a fast forward operation on the track.

6. The method of claim 4, wherein the playing of the portion of the track further comprises performing, if the flick and hold is performed in a direction opposite to the direction of progress of the playing point while the track is playing, a rewind operation on the track.

7. The method of claim 2, further comprising selecting and playing, if a flick action is performed through an end of the playing progress bar, at least one of a previous track and a next track to the track being played.

8. The method of claim 2, further comprising changing, if a flick and hold action is performed on the volume control bar, the volume of a track being played to a volume level corresponding to a position where the hold occurs.

9. The method of claim 8, further comprising moving the volume control bar and the playing progress bar to the position where the hold occurs.

10. The method of claim 2, further comprising pausing, if a touch is performed on the display unit, the playback of a track being played.

11. The method of claim 10, further comprising resuming, if a touch is performed on the display unit in a state in which the playback of the track is paused, the playback of the track.

12. A terminal including a music player comprising:
a memory unit for storing music tracks;
a music player for playing the music tracks;
a display unit comprising a touch screen for displaying a point where a playing progress bar indicating a current play time for a track being played and a volume control bar intersect as a playing point; and
a controller for controlling the display unit to display the playing progress bar in a first direction and the volume control bar in a second direction that intersects with the playing progress bar such that the volume control bar moves correspondingly as the current play time changes.

13. The terminal of claim 12, wherein the first and second directions are horizontal and vertical to the display unit, respectively.

14. The terminal of claim 13, wherein the controller moves the volume control bar in the horizontal direction and controls the display unit to display a point where the playing progress bar and the volume control bar intersect as a playing point.

15. The terminal of claim 14, wherein, if a flick and hold action is performed on the playing progress bar in a direction of progress of the playing point while the track is playing, the controller performs a fast forward operation on the track.

16. The terminal of claim 14, wherein, if a flick and hold action is performed on the playing progress bar in a direction opposite to the direction of progress of the playing point while the track is playing, the controller performs a rewind operation on the track.

17. The terminal of claim 14, wherein, if a flick and hold action is performed upwards on the volume control bar, the controller increases the volume of the track being played.

18. The terminal of claim 14, wherein, if a flick and hold action is performed downwards on the volume control bar, the controller decreases the volume of the track being played.

19. The terminal of claim 14, wherein, if a touch is performed on the display unit, the controller pauses the playback of the track being played.

20. The terminal of claim 19, wherein, if a touch is performed on the display unit in a state in which the playback of the track is paused, the controller resumes the playback of the track.

21. A music player including a touch screen comprising:
a memory unit for storing music tracks; and
a controller for playing the music tracks, for displaying a point where a playing progress bar indicating a current play time for a track being played and a volume control bar intersect as a playing point on the touch screen, and for controlling the touch screen to display the playing progress bar in a first direction and the volume control bar in a second direction that intersects with the playing progress bar such that the volume control bar moves correspondingly as the current play time changes.

* * * * *